(12) United States Patent
Kinoshita

(10) Patent No.: US 10,919,469 B2
(45) Date of Patent: Feb. 16, 2021

(54) VEHICLE POWER SUPPLY APPARATUS

(71) Applicant: SUBARU CORPORATION, Tokyo (JP)

(72) Inventor: Takahiro Kinoshita, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 16/505,118

(22) Filed: Jul. 8, 2019

(65) Prior Publication Data

US 2020/0079306 A1 Mar. 12, 2020

(30) Foreign Application Priority Data

Sep. 10, 2018 (JP) .................................. 2018-168536

(51) Int. Cl.
*B60R 16/03* (2006.01)
*B60R 16/033* (2006.01)
*B60R 16/04* (2006.01)
*H01M 10/44* (2006.01)

(52) U.S. Cl.
CPC ........ *B60R 16/033* (2013.01); *B60R 16/0307* (2013.01); *B60R 16/04* (2013.01); *H01M 10/44* (2013.01)

(58) Field of Classification Search
CPC ... B60R 16/033; B60R 16/0307; B60R 16/04; B60R 16/03; H01M 10/44; B60L 3/0061
See application file for complete search history.

(56) References Cited

U.S. PATENT DOCUMENTS

2015/0329007 A1\* 11/2015 Matsunaga ............. B60L 58/20
320/126
2017/0182892 A1 6/2017 Kinoshita

FOREIGN PATENT DOCUMENTS

| JP | 2017-095004 A | | 6/2017 | |
| JP | 2017-118699 | \* | 6/2017 | ............... H02J 7/14 |
| JP | 2017-118699 A | | 6/2017 | |

OTHER PUBLICATIONS

Japanese Notice of Reasons for Refusal issued in corresponding Japanese Patent Application No. 2018-168536, dated Mar. 10, 2020, with English translation.

\* cited by examiner

*Primary Examiner* — Jung Kim
(74) *Attorney, Agent, or Firm* — McDermott Will & Emery LLP

(57) ABSTRACT

A vehicle power supply apparatus includes first and second power supply systems, an electrical conduction path, first and second switches, and an abnormality determination unit. The first power supply system includes a first electrical energy accumulator and an electric load. The second power supply system includes a generator and a second electrical energy accumulator. The first switch is provided on the electrical conduction path between the first and second power supply systems. The second switch is provided in the second power supply system. The abnormality determination unit determines whether or not the generator is in an abnormal state, on the basis of a current of the first or second electrical energy accumulator, with the first switch or the second switch, or both turned on, and with a power generation command outputted to the generator.

19 Claims, 13 Drawing Sheets

[DETERMINATION PATTERN 2]
[ISG: POWER GENERATION/SW1: ON/SW2: OFF]

(A) [ISG: NORMAL]

[DETERMINATION PATTERN 2]
[ISG: POWER GENERATION/SW1: ON/SW2: OFF]

(B) [ISG: ABNORMAL]

[DETERMINATION PATTERN 3]
[ISG: POWER GENERATION/SW1: OFF/SW2: ON]

(A) [ISG: NORMAL]

[DETERMINATION PATTERN 2]
[ISG: POWER GENERATION/SW1: OFF/SW2: ON]

(B) [ISG: ABNORMAL]

VEHICLE POWER SUPPLY APPARATUS

CROSS-REFERENCE TO RELATED APPLICATIONS

This application claims priority from Japanese Patent Application No. 2018-168536 filed on Sep. 10, 2018, the entire contents of which are hereby incorporated by reference.

BACKGROUND

The technology relates to a vehicle power supply apparatus to be mounted on a vehicle.

A vehicle power supply apparatus to be mounted on a vehicle includes not only an accumulator such as a lead battery and a lithium ion battery but also a generator such as a motor generator and an integrated starter generator (ISG). For example, reference can be made to Japanese Unexamined Patent Application Publication (JP-A) No. 2017-118699.

SUMMARY

An aspect of the technology provides a vehicle power supply apparatus to be mounted on a vehicle that includes an engine. The vehicle power supply apparatus includes a first power supply system, a second power supply system, an electrical conduction path, a first switch, a second switch, an abnormality determination unit. The first power supply system includes a first electrical energy accumulator and an electric load coupled to the first electrical energy accumulator. The second power supply system includes a generator and a second electrical energy accumulator. The generator is coupled to the engine. The second electrical energy accumulator is able to be coupled to the generator. The electrical conduction path is provided between the first power supply system and the second power supply system and is configured to couple the first electrical energy accumulator and the second electrical energy accumulator in parallel to each other. The first switch is provided on the electrical conduction path and is configured to be turned on to couple the first power supply system and the second power supply system to each other, and turned off to isolate the first power supply system and the second power supply system from each other. The second switch is provided in the second power supply system and is configured to be turned on to couple the generator and the second electrical energy accumulator to each other, and turned off to isolate the generator and the second electrical energy accumulator from each other. The abnormality determination unit is configured to determine whether or not the generator is in an abnormal state, on the basis of a current of the first electrical energy accumulator or the second electrical energy accumulator, with the first switch or the second switch, or both turned on, and with a power generation command outputted to the generator.

An aspect of the technology provides a vehicle power supply apparatus to be mounted on a vehicle that includes an engine. The vehicle power supply apparatus includes a first power supply system, a second power supply system, an electrical conduction path, a first switch, a second switch, and circuitry. The first power supply system includes a first electrical energy accumulator and an electric load coupled to the first electrical energy accumulator. The second power supply system includes a generator and a second electrical energy accumulator. The generator is coupled to the engine. The second electrical energy accumulator is able to be coupled to the generator. The electrical conduction path is provided between the first power supply system and the second power supply system and is configured to couple the first electrical energy accumulator and the second electrical energy accumulator in parallel to each other. The first switch is provided on the electrical conduction path and is configured to be turned on to couple the first power supply system and the second power supply system to each other, and turned off to isolate the first power supply system and the second power supply system from each other. The second switch is provided in the second power supply system and is configured to be turned on to couple the generator and the second electrical energy accumulator to each other, and turned off to isolate the generator and the second electrical energy accumulator from each other. The circuitry is configured to determine whether or not the generator is in an abnormal state, on the basis of a current of the first electrical energy accumulator or the second electrical energy accumulator, with the first switch or the second switch, or both turned on, and with a power generation command outputted to the generator.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
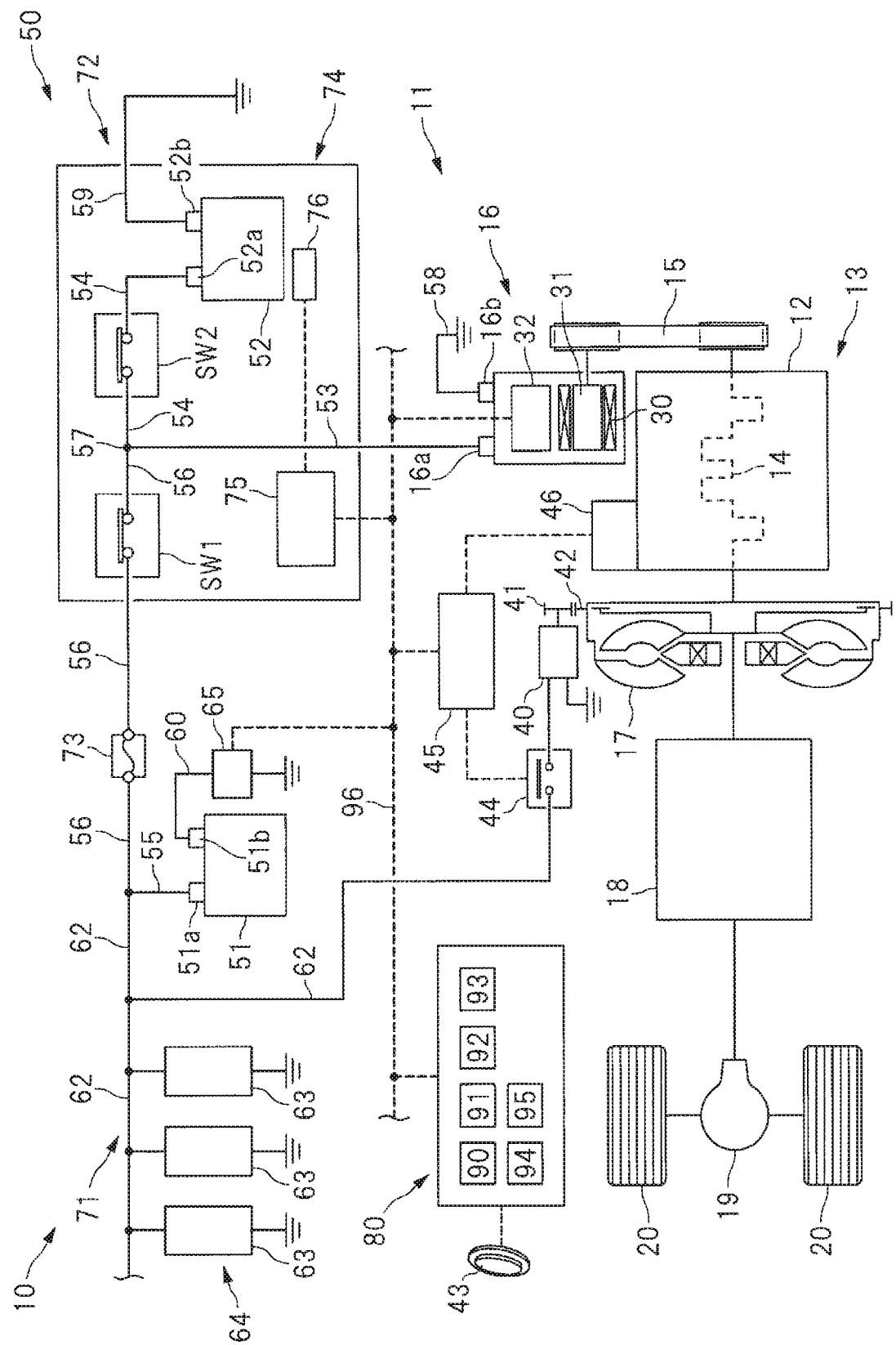
FIG. 1 is a schematic diagram of a configuration example of a vehicle on which a vehicle power supply apparatus according to one embodiment of the technology is mounted.

In the following, some preferred but non-limiting embodiments of the technology are described in detail with reference to the accompanying drawings. Note that sizes, materials, specific values, and any other factors illustrated in respective embodiments are illustrative for easier understanding of the technology, and are not intended to limit the scope of the technology unless otherwise specifically stated. Further, elements in the following example embodiments which are not recited in a most-generic independent claim of the technology are optional and may be provided on an as-needed basis. Throughout the specification and the drawings, elements having substantially the same function and configuration are denoted with the same reference numerals to avoid any redundant description. Further, elements that are not directly related to the technology are unillustrated in the drawings. The drawings are schematic and are not intended to be drawn to scale.

Even in a case with an abnormal state of a generator, e.g., a power generation failure, electric power accumulated in, for example, a lead battery and a lithium ion battery makes it possible for a vehicle to keep on traveling for predetermined time. However, depletion of the electric power from, for example, the lead battery renders it difficult for the vehicle to keep on traveling. What is desired is, therefore, to determine the abnormal state of the generator at an early stage.

It is desirable to provide a vehicle power supply apparatus that makes it possible to determine an abnormal state of a generator at an early stage.

[Vehicle Configuration]

FIG. 1 schematically illustrates a configuration example of a vehicle 11 on which a vehicle power supply apparatus 10 according to one embodiment of the technology is mounted. Referring to FIG. 1, on the vehicle 11, a power unit 13 may be mounted. The power unit 13 may include an engine 12 that serves as a power source. The engine 12 may include a crank shaft 14 to which a starter generator 16 is coupled through a belt mechanism 15. A transmission mechanism 18 may be also coupled to the engine 12 through a torque converter 17. One or more wheels 20 may be coupled to the transmission mechanism 18 through, for example but not limited to, a differential mechanism 19.

In one embodiment of the technology, the starter generator 16 may serve as a "generator".

The starter generator 16 coupled to the engine 12 may be a so-called integrated starter generator (ISG) that serves as a generator and an electric motor. Not only may the starter generator 16 serve as the generator driven by the crank shaft 14, the starter generator 16 may also serve as the electric motor that drives the crank shaft 14. For example, the starter generator 16 may be controlled to a powering state, in a case of a restart of the engine 12 in an idling stop control, or in a case of assistance with the engine 12 at the time of, for example, a start and acceleration. Thus, the starter generator 16 may serve as the electric motor.

The starter generator 16 may include a stator 30 and a rotor 31. The stator 30 may include a stator coil. The rotor 31 may include a field coil. The starter generator 16 may further include an ISG controller 32, in order to control energized states of the stator coil and the field coil. The ISG controller 32 may include an inverter, a regulator, a microcomputer, various sensors, and other parts. Allowing the ISG controller 32 to control the energized states of the field coil and the stator coil makes it possible to control, for example but not limited to, a power generation voltage, power generation torque, and powering torque of the starter generator 16.

The power unit 13 may include a starter motor 40 that brings the engine 12 to starting rotation. The starter motor 40 may include a pinion 41. The pinion 41 is able to move between a protruding position and a retreating position. At the protruding position, the pinion 41 is engaged with a ring gear 42 of the torque converter 17. At the retreating position, the engagement of the pinion 41 with the ring gear 42 is released. As described later, an occupant operates, e.g., presses down, a starter button 43, and thereupon, a starter relay 44 is switched to an ON state. The starter relay 44 may control energization of the starter motor 40. Thus, the starter motor 40 is energized through the starter relay 44, causing the pinion 41 of the starter motor 40 to move to the protruding position and to rotate. Moreover, the vehicle 11 may include an engine controller 45 in order to control the starter motor 40 through the starter relay 44. The engine controller 45 may include, for example but not limited to, a microcomputer. The engine controller 45 may control not only the starter relay 44 but also engine auxiliaries 46 such as a throttle valve, an injector, and an ignition device.

As described, the vehicle 11 in the figures may include the starter generator 16 and the starter motor 40. The starting rotation of the engine 12 is performed with the use of the starter generator 16, in a case of the restart of the engine 12 in accompaniment with the idling stop control, i.e., in a case where the engine 12 is stopped because a stop condition is satisfied while the engine 12 is in operation, and the engine 12 is restarted because a start condition is satisfied while the engine 12 is stopped. Meanwhile, the starting rotation of the engine 12 is performed with the use of the starter motor 40, in a case where a control system of the vehicle 11 is started up to cause an initial start of the engine 12, i.e., in a case where the occupant operates the starter button 43 to start the engine 12.

[Power Circuit]

Figure 2:
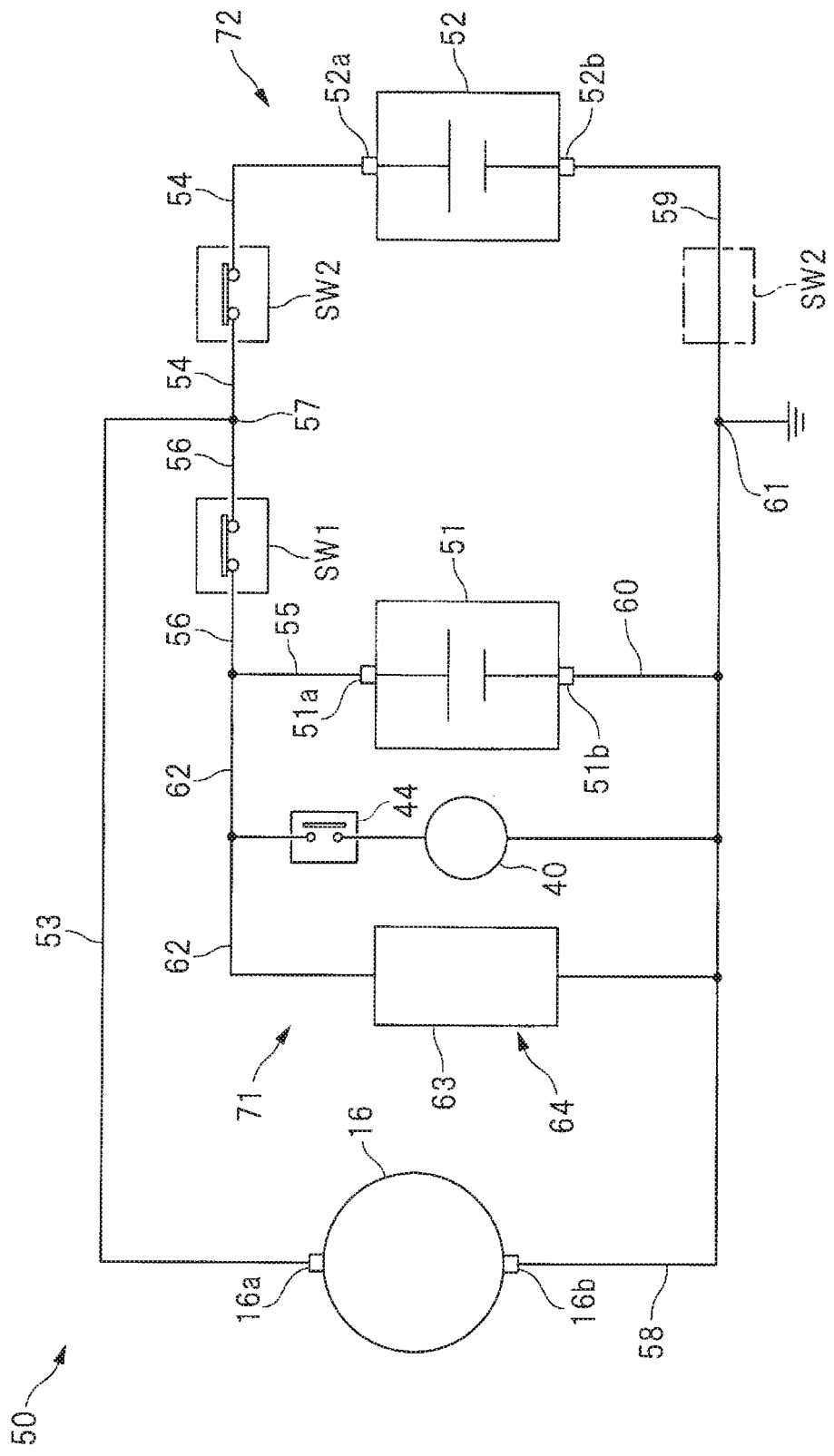
FIG. 2 is a circuit diagram of a simplified example of a power circuit.

The vehicle power supply apparatus 10 may include a power circuit 50, description of which is given below. FIG. 2 is a circuit diagram of a simplified example of the power circuit 50. Referring to FIG. 2, the power circuit 50 may include a lead battery 51 and a lithium ion battery 52. The lead battery 51 may be electrically coupled to the starter generator 16. The lithium ion battery 52 may be electrically coupled, in parallel with the lead battery 51, to the starter generator 16. It is to be noted that a terminal voltage of the lithium ion battery 52 may be higher in design than a terminal voltage of the lead battery 51, in order to positively cause discharge of the lithium ion battery 52. Moreover, internal resistance of the lithium ion battery 52 may be lower in design than internal resistance of the lead battery 51, in order to positively cause charge and the discharge of the lithium ion battery 52.

In one embodiment of the technology, the lead battery 51 may serve as a "first electrical energy accumulator". In one embodiment of the technology, the lithium ion battery 52 may serve as a "second electrical energy accumulator".

A positive electrode line 53 may be coupled to a positive electrode terminal 16a of the starter generator 16. A positive electrode line 54 may be coupled to a positive electrode terminal 52a of the lithium ion battery 52. A positive electrode line 56 may be coupled to a positive electrode terminal 51a of the lead battery 51 through a positive electrode line 55. The positive electrode lines 53, 54, and 56 may be coupled to one another through a connection point 57. Moreover, a negative electrode line 58 may be coupled to a negative electrode terminal 16b of the starter generator 16. A negative electrode line 59 may be coupled to a negative electrode terminal 52b of the lithium ion battery 52. A negative electrode line 60 may be coupled to a negative electrode terminal 51b of the lead battery 51. The negative electrode lines 58, 59, and 60 may be coupled to one another through a reference potential point 61.

As illustrated in FIG. 1, to the positive electrode line 55 of the lead battery 51, coupled may be a positive electrode line 62. To the positive electrode line 62, coupled may be a group of electric devices 64 including electric devices 63 such as various actuators and various controllers. Moreover, on the negative electrode line 60 of the lead battery 51, provided may be a battery sensor 65. The battery sensor 65 may have a function of detecting a charge current, a discharge current, and the terminal voltage of the lead battery 51. The battery sensor 65 may further have a function of detecting a state of charge SOC of the lead battery 51 on the basis of, for example, the charge current and the discharge current. It is to be noted that the battery sensor 65 may be also coupled to the positive electrode terminal 51a of the lead battery 51 through an undepicted electrical conduction line.

In one embodiment of the technology, the electric devices 63 may each serve as an "electric load".

It is to be noted that the state of charge SOC of the lead battery 51 refers to a ratio that indicates an amount of remaining electrical energy of the lead battery 51, or a ratio of an amount of accumulated electric energy to a full charged capacity of the lead battery 51. For example, in a case where the lead battery 51 is charged to an upper limit capacity, the state of charge SOC may be calculated as 100%. For example, in a case where the lead battery 51 discharges to a lower limit capacity, the state of charge SOC may be calculated as 0%.

The power circuit 50 may include a first power supply system 71 and a second power supply system 72. The first power supply system 71 includes the lead battery 51 and the electric devices 63. The second power supply system 72 includes the lithium ion battery 52 and the starter generator 16. The lead battery 51 and the lithium ion battery 52 are coupled in parallel to each other through the positive electrode line 56 provided between the first power supply system 71 and the second power supply system 72. On the positive electrode line 56, provided may be an electric power fuse 73 and a switch SW1. The electric power fuse 73 is configured to be melted down by an excessive current. The switch SW1 is configured to be turned on and off, i.e., controlled to an ON state and an OFF state. Moreover, on the positive electrode line 54 of the lithium ion battery 52, provided may be a switch SW2. The switch SW2 is configured to be turned on and off, i.e., controlled to an ON state and an OFF state.

In one embodiment of the technology, the positive electrode line 56 may serve as an "electrical conduction path". In one embodiment of the technology, the switch SW1 may serve as a "first switch", and the switch SW2 may serve as a "second switch".

Turning on the switch SW1, i.e., controlling the switch SW1 to the ON state makes it possible to couple the first power supply system 71 and the second power supply system 72 to each other. Turning off the switch SW1, i.e., controlling the switch SW1 to the OFF state makes it possible to isolate the first power supply system 71 and the second power supply system 72 from each other. Moreover, turning on the switch SW2, i.e., controlling the switch SW2 to the ON state makes it possible to couple the starter generator 16 and the lithium ion battery 52 to each other. Turning off the switch SW2, i.e., controlling the switch SW2 to the OFF state makes it possible to isolate the starter generator 16 and the lithium ion battery 52 from each other.

The switches SW1 and SW2 may each be a switch including a semiconductor element such as a metal oxide semiconductor field effect transistor (MOSFET), or alternatively the switches SW1 and SW2 may each be a switch that causes a contact to mechanically open or close with the use of, for example but not limited to, electromagnetic force. The ON state of the switches SW1 and SW2 refers to an energized state that forms electrical coupling, or a conductive state. The OFF state of the switches SW1 and SW2 refers to a non-energized state that forms electrical isolation, or a cutoff state. It is to be noted that the switches SW1 and SW2 may be also referred to as, for example, a relay or a contactor.

As illustrated in FIG. 1, the power circuit 50 may include a battery module 74. The battery module 74 may include not only the lithium ion battery 52 but also the switches SW1 and SW2. The battery module 74 may further include a battery controller 75. The battery controller 75 may include, for example but not limited to, a microcomputer and various sensors. The battery module 74 may further include a battery sensor 76. The battery sensor 76 may detect, for example but not limited to, a charge current, a discharge current, the terminal voltage, and a temperature of the lithium ion battery 52. Moreover, the battery controller 75 may have a function of calculating a state of charge SOC of the lithium ion battery 52 on the basis of, for example but not limited to, the charge current and the discharge current to be transmitted from the battery sensor 76. Furthermore, the battery controller 75 may have a function of controlling the switches SW1 and SW2 on the basis of, for example but not limited to, the state of charge SOC of the lithium ion battery 52.

It is to be noted that the state of charge SOC of the lithium ion battery 52 refers to a ratio that indicates an amount of remaining electrical energy of the lithium ion battery 52, or a ratio of an amount of accumulated electrical energy to a full charged capacity of the lithium ion battery 52. For example, in a case where the lithium ion battery 52 is charged to an upper limit capacity, the state of charge SOC may be calculated as 100%. For example, in a case where the lithium ion battery 52 discharges to a lower limit capacity, the state of charge SOC may be calculated as 0%.

[Control System]

As illustrated in FIG. 1, the vehicle power supply apparatus 10 may include a main controller 80. The main controller 80 is provided for a cooperative control of, for example but not limited to, the power unit 13 and the power circuit 50. The main controller 80 may include, for example but not limited to, a microcomputer. The main controller 80 may include an engine control unit 90, an ISG control unit 91, and a switch control unit 92. The engine control unit 90 may control the engine 12. The ISG control unit 91 may control the starter generator 16. The switch control unit 92 may control the switches SW1 and SW2. The main controller 80 may further include an idling control unit 93 and an assistance control unit 94. The idling control unit 93 may execute the idling stop control described later. The assistance control unit 94 may execute a motor assistance control described later. Furthermore, the main controller 80 may include an abnormality determination unit 95. The abnormality determination unit 95 may execute an ISG abnormality determination control described later.

The main controller 80, the ISG controller 32, the engine controller 45, and the battery controller 75 may be communicatively coupled to one another through an on-vehicle network 96 such as a controller area network (CAN) and a local interconnect network (LIN). The main controller 80 may control the power unit 13, the power circuit 50, and other parts on the basis of information from the controllers and the sensors. It is to be noted that the main controller 80 may control the starter generator 16 through the ISG controller 32, and control the switches SW1 and SW2 through the battery controller 75. Moreover, the main controller 80 may control the engine 12 and the starter motor 40 through the engine controller 45.

[Power Generation Control of Starter Generator]

Description is given next of a power generation control of the starter generator 16. The power generation control may be made by the main controller 80. The ISG control unit 91 of the main controller 80 may supply a control signal to the ISG controller 32, to control the starter generator 16 to a power generation state or the powering state. The power generation state of the starter generator 16 may include a combustion power generation state and a regenerative power generation state described later. For example, in a case where the state of charge SOC of the lithium ion battery 52 lowers, the ISG control unit 91 may raise the power generation voltage of the starter generator 16, to control the starter generator 16 to the combustion power generation state. In a case where the state of charge SOC of the lithium ion battery 52 increases, the ISG control unit 91 may lower the power generation voltage of the starter generator 16, to control the starter generator 16 to a power generation suspended state. It is to be noted that in FIG. 3 and subsequent figures which are described below, the starter generator 16 is abbreviated to "ISG".

Figure 3:
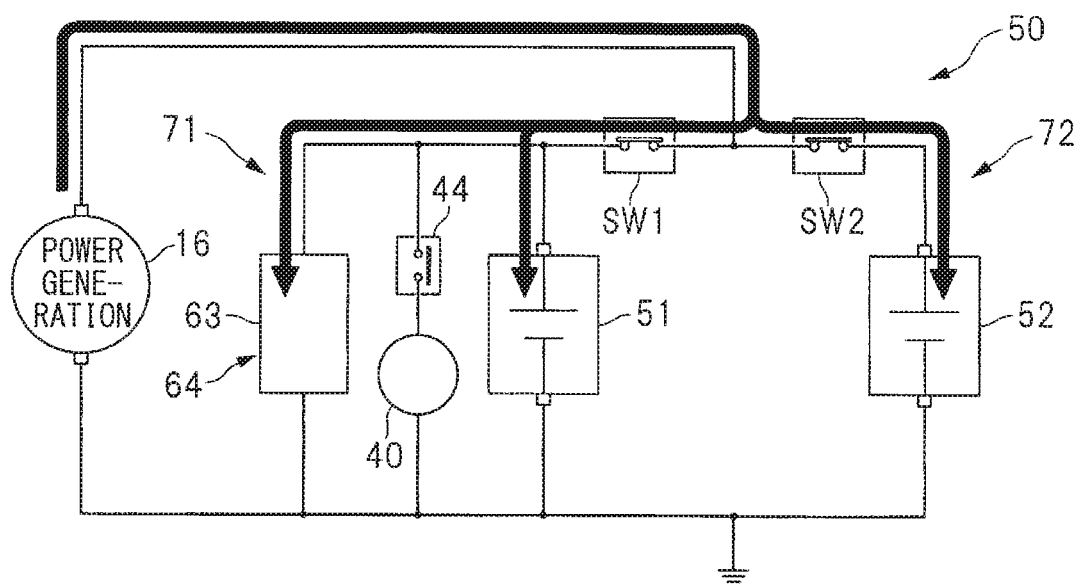
FIG. 3 is a diagram of an example of a situation as to how currents are supplied, with a starter generator controlled to a combustion power generation state.

FIG. 3 illustrates an example of a situation as to how currents are supplied, with the starter generator 16 controlled to the combustion power generation state. It is to be noted that the combustion power generation state of the starter generator 16 means allowing, by the engine power, the starter generator 16 to generate power, i.e., causing fuel combustion inside the engine 12 to allow the starter generator 16 to generate power. In one specific but non-limiting example, in a case where the state of charge SOC of the lithium ion battery 52 is lower than a predetermined lower limit, the starter generator 16 may be allowed, by the engine power, to generate power, in order to charge the lithium ion battery 52 and to increase the state of charge SOC. Thus, in controlling the starter generator 16 to the combustion power generation state, the power generation voltage of the starter generator 16 may be raised to a greater value than the terminal voltages of the lead battery 51 and the lithium ion battery 52. In this way, as denoted by black arrows in FIG. 3, currents may be supplied from the starter generator 16 to, for example, the lithium ion battery 52, the group of the electric devices 64, and the lead battery 51, causing the lithium ion battery 52 and the lead battery 51 to be charged slowly.

Figure 4:
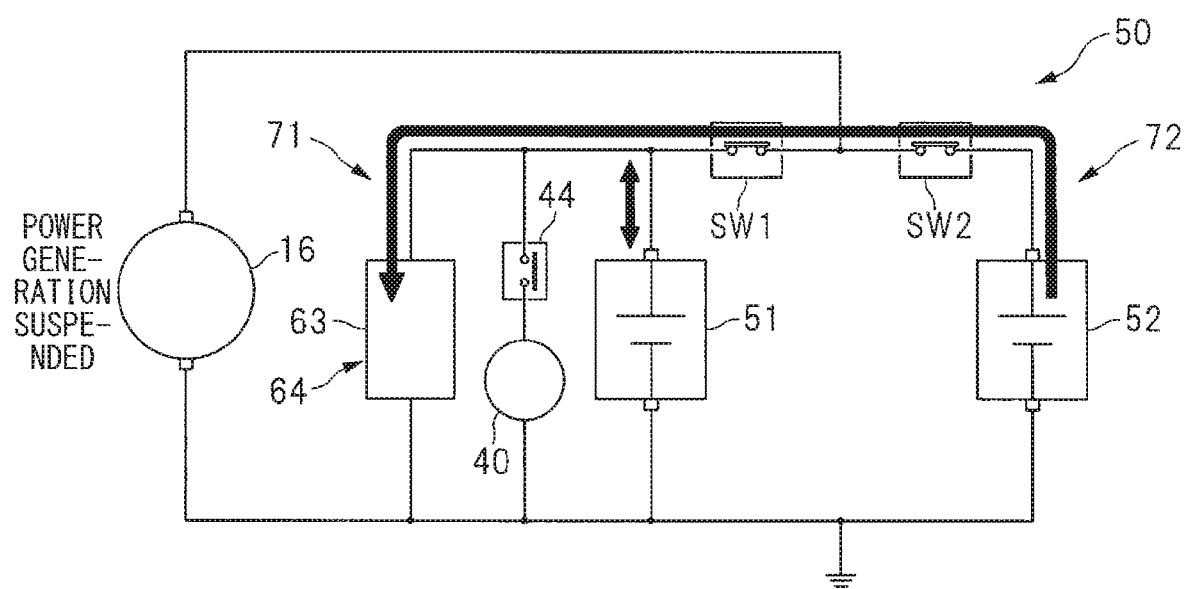
FIG. 4 is a diagram of an example of a situation as to how currents are supplied, with the starter generator controlled to a power generation suspended state.

FIG. 4 illustrates an example of a situation as to how currents are supplied, with the starter generator 16 controlled to the power generation suspended state. In one specific but non-limiting example, in a case where the state of charge SOC of the lithium ion battery 52 is higher than a predetermined upper limit, power generation by the starter generator 16 with the use of the engine power may be stopped, in order to positively cause the discharge of the lithium ion battery 52. Thus, in controlling the starter generator 16 to the power generation suspended state, the power generation voltage of the starter generator 16 may be lowered to a smaller value than the terminal voltages of the lead battery 51 and the lithium ion battery 52. In this way, as denoted by black arrows in FIG. 4, a current may be supplied from the lithium ion battery 52 to the group of the electric devices 64. This makes it possible to stop the power generation by the starter generator 16, leading to reduction in an engine load. It is to be noted that it suffices for the power generation voltage of the starter generator 16 in the power generation suspended state to be a power generation voltage that allows the lithium ion battery 52 to discharge. For example, the power generation voltage of the starter generator 16 may be controlled to 0 (zero) V, or alternatively, the power generation voltage of the starter generator 16 may be controlled to a greater value than 0 (zero) V.

As mentioned above, the ISG control unit 91 of the main controller 80 may control the starter generator 16 to the combustion power generation state or the power generation suspended state on the basis of the state of charge SOC of the lithium ion battery 52. Meanwhile, at the time of vehicle deceleration, it is desirable to recover much kinetic energy to enhance fuel consumption performance. Therefore, at the time of the vehicle deceleration, the power generation voltage of the starter generator 16 may be raised, to control the starter generator 16 to the regenerative power generation state. This makes it possible to increase power-generated electric power of the starter generator 16. It is therefore possible to positively convert the kinetic energy to electric energy and to recover the electric energy, leading to higher energy efficiency of the vehicle 11 and enhancement in the fuel consumption performance. A determination as to whether or not to execute regenerative power generation as described above may be made on the basis of, for example but not limited to, operation states of an accelerator pedal and a brake pedal. For example, on decelerated travel with a release of stepping down of the accelerator pedal, or on decelerated travel with stepping down of the brake pedal, the starter generator 16 may be controlled to the regenerative power generation state.

Figure 5:
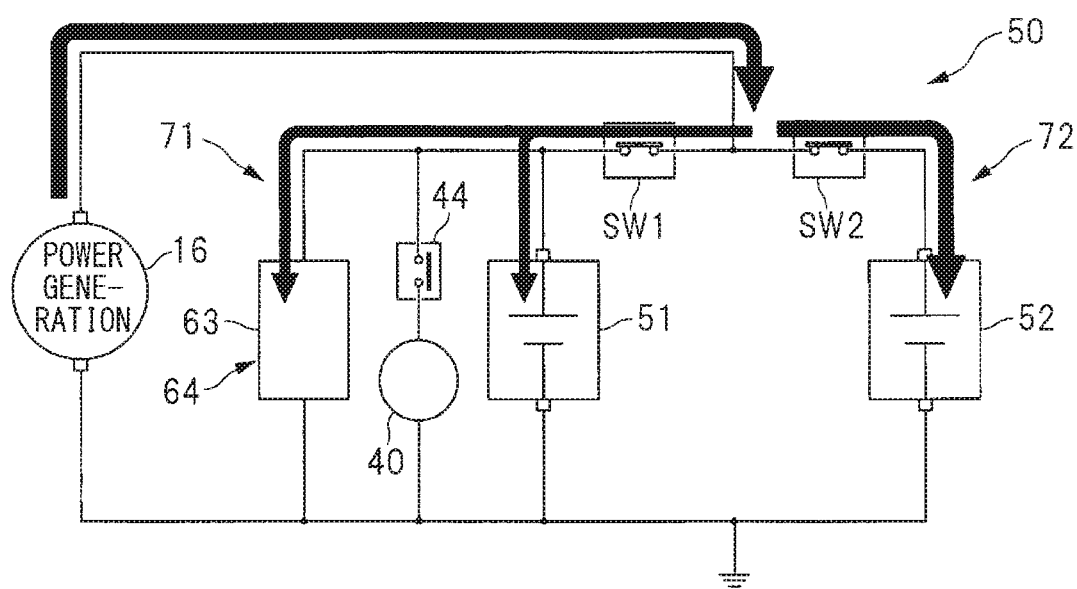
FIG. 5 is a diagram of an example of a situation as to how currents are supplied, with the starter generator controlled to a regenerative power generation state.

FIG. 5 illustrates an example of a situation as to how currents are supplied, with the starter generator 16 controlled to the regenerative power generation state. In controlling the starter generator 16 to the regenerative power generation state, the power generation voltage of the starter generator 16 may be raised to a higher value than in the combustion power generation state as mentioned above. This causes large current supply from the starter generator 16 to the lithium ion battery 52 and the lead battery 51, as denoted by black arrows in FIG. 5, resulting in rapid charge of the lithium ion battery 52 and the lead battery 51. Moreover, because the internal resistance of the lithium ion battery 52 is smaller than the internal resistance of the lead battery 51, most of the power-generated current is supplied to the lithium ion battery 52.

It is to be noted that as illustrated in FIGS. 3 to 5, in controlling the starter generator 16 to the combustion power generation state, the regenerative power generation state, and the power generation suspended state, the switches SW1 and SW2 may be kept in the ON state. In other words, in the vehicle power supply apparatus 10, it is possible to control the charge and the discharge of the lithium ion battery 52 solely by controlling the power generation voltage of the starter generator 16 without making a switching control of the switches SW1 and SW2. Hence, it is possible to easily control the charge and the discharge of the lithium ion battery 52, and to enhance durability of the switches SW1 and SW2.

[Engine Restart in Idling Stop Control]

The idling control unit 93 of the main controller 80 may execute the idling stop control. The idling stop control includes automatically stopping and restarting the engine 12. The idling control unit 93 may execute, for example but not limited to, a fuel cut to stop the engine 12, in the case where the predetermined stop condition is satisfied while the engine 12 is in operation. The idling control unit 93 may bring the starter generator 16 to rotation to restart the engine 12, in the case where the predetermined start condition is satisfied while the engine 12 is stopped. Non-limiting examples of the stop condition of the engine 12 may include that a vehicle speed is lower than a predetermined value, with the brake pedal being stepped down. Non-limiting examples of the start condition of the engine 12 may include that the stepping down of the brake pedal is released, and that the stepping down of the accelerator pedal is started. It is to be noted that in executing the idling stop control, the idling control unit 93 may supply a control signal to the engine control unit 90 and the ISG control unit 91, to control the engine 12 and the starter generator 16.

Figure 6:
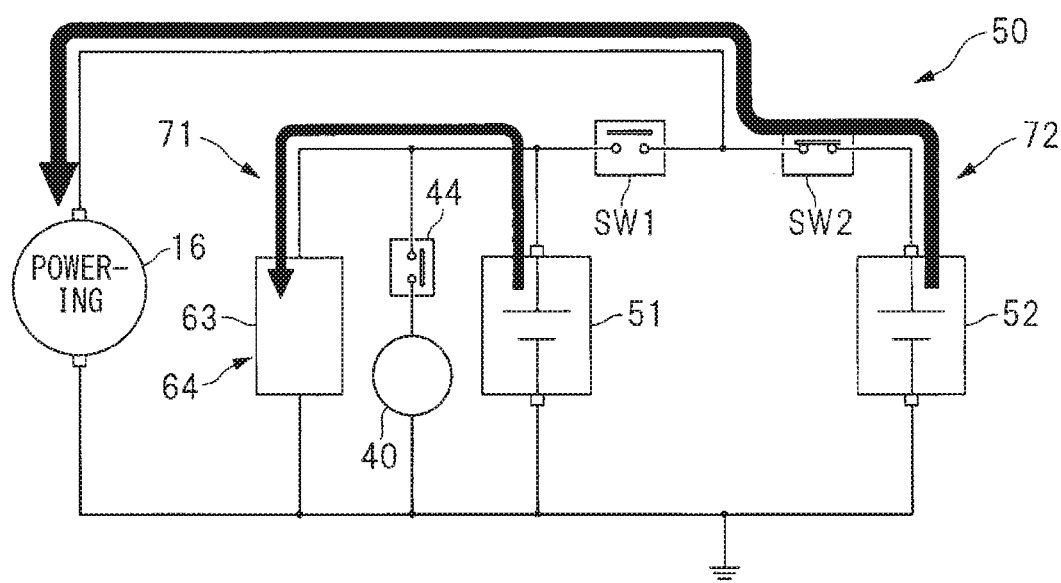
FIG. 6 is a diagram of an example of a situation as to how currents are supplied, with the starter generator controlled to a powering state.

The idling control unit 93 may control the starter generator 16 to the powering state, to bring the engine 12 to the starting rotation, in a case where the start condition is satisfied while the engine 12 is stopped in the idling stop control. FIG. 6 illustrates an example of a situation as to how currents are supplied, with the starter generator 16 controlled to the powering state. As illustrated in FIG. 6, in controlling the starter generator 16 to the powering state at the restart of the engine 12 in the idling stop control, the switch SW1 may be controlled to the OFF state, and the switch SW2 may be controlled to the ON state. In other words, in allowing the starter generator 16 to bring the engine 12 to the starting rotation, the switch SW1 may be switched to the OFF state, causing the isolation of the first power supply system 71 and the second power supply system 72 from each other. This makes it possible to prevent an instantaneous voltage drop with respect to the group of the electric devices 64 of the first power supply system 71 even in a case with large current supply from the lithium ion battery 52 to the starter generator 16. It is therefore possible to allow the group of the electric devices 64, without limitation, to function normally.

[Motor Assistance Control]

The assistance control unit 94 of the main controller 80 may control the starter generator 16 to the powering state at the time of, for example, the start and the acceleration, to execute the motor assistance control. The motor assistance control includes allowing the starter generator 16 to provide assistance to the engine 12. It is to be noted that in executing the motor assistance control, the assistance control unit 94 may supply a control signal to the ISG control unit 91, to control the starter generator 16.

Figure 7:
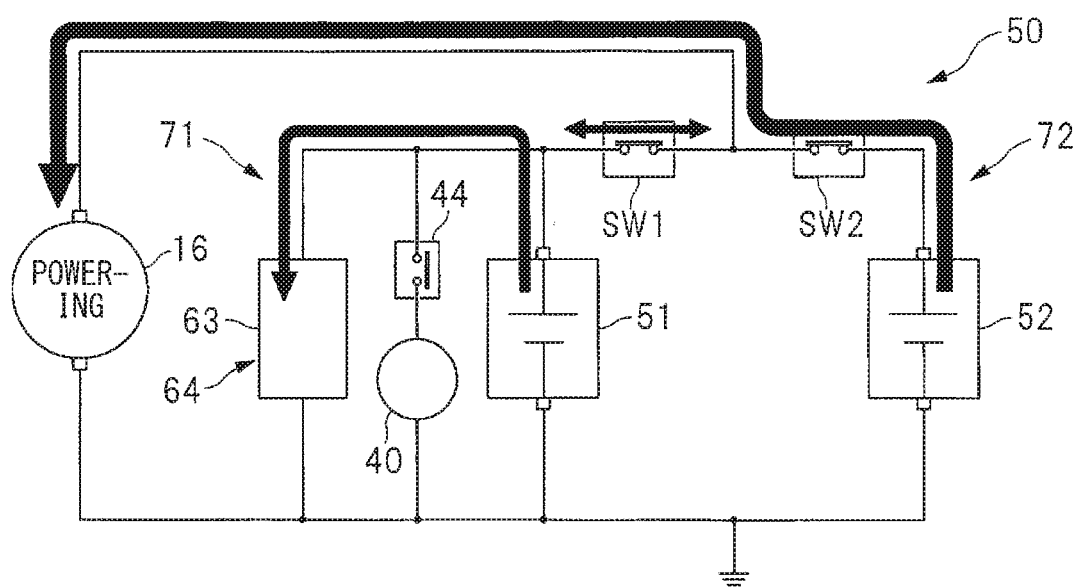
FIG. 7 is a diagram of an example of a situation as to how currents are supplied, with the starter generator controlled to the powering state.

FIG. 7 illustrates an example of a situation as to how currents are supplied, with the starter generator 16 controlled to the powering state. As illustrated in FIG. 7, in controlling the starter generator 16 to the powering state in accompaniment with the motor assistance control, the switches SW1 and SW2 may both be controlled to the ON state. Thus, in the case where the starter generator 16 is allowed to provide assistance to the engine 12, controlling the switches SW1 and SW2 to the ON state causes both the lead battery 51 and the lithium ion battery 52 to be coupled to the group of the electric devices 64. This makes it possible to stabilize a power supply voltage of the group of the electric devices 64, leading to enhanced reliability of the vehicle power supply apparatus 10.

As mentioned above, the switch SW1 may be switched to the OFF state at the restart of the engine 12 by the starter generator 16. Meanwhile, the switch SW1 may be kept at the ON state while the starter generator 16 provides motor assistance. In other words, the restart of the engine 12 means a situation that the starter generator 16 causes the engine 12 that is stopped to start rotation. Such a situation may easily involve an increase in power consumption of the starter generator 16. In contrast, the motor assistance means a situation that the starter generator 16 may supplementarily drive the engine 12 that is rotating. Such a situation may involve reduction in the power consumption of the starter generator 16. Because the power consumption of the starter generator 16 is reduced as mentioned above in the motor assistance control, keeping the switch SW1 at the ON state hardly causes large current supply from the lead battery 51 to the starter generator 16. It is therefore possible to stabilize the power supply voltage of the group of the electric devices 64.

[Engine Initial Start Control and Lead Battery Supplementary Charge Control]

Figure 8:
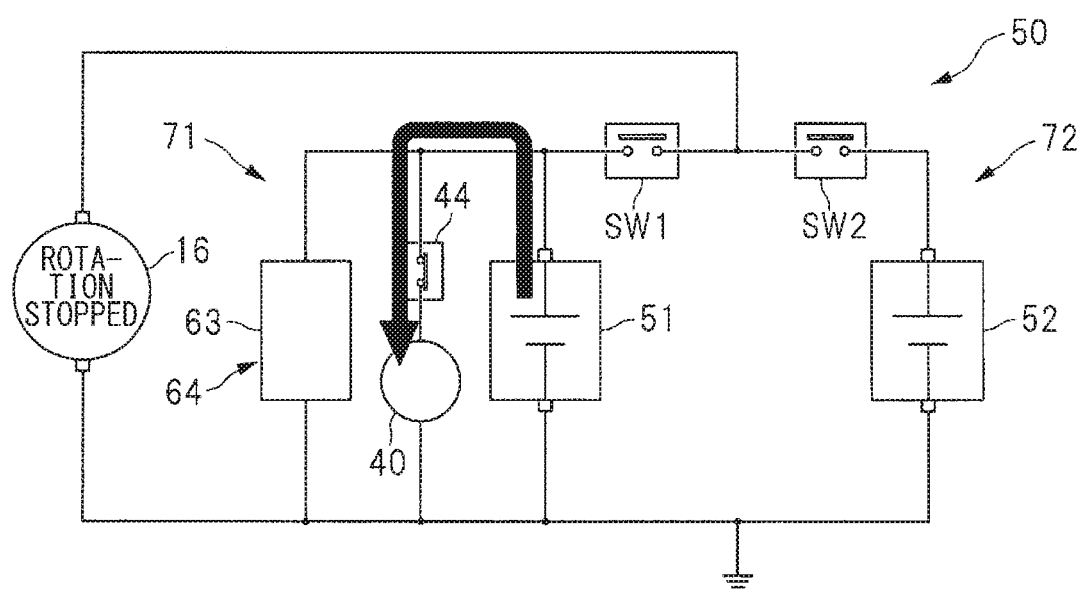
FIG. 8 is a diagram of an example of a situation as to how currents are supplied, in an engine initial start control.
Figure 9:
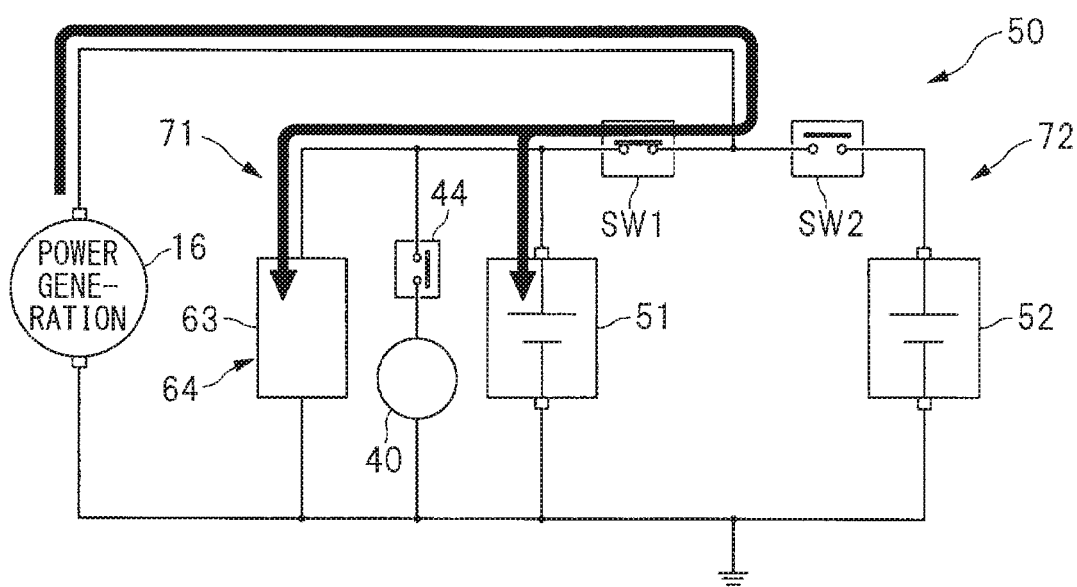
FIG. 9 is a diagram of an example of a situation as to how currents are supplied, in a lead battery supplementary charge control.

Described next is an engine initial start control that includes starting the engine 12 with the use of the starter motor 40, following which described is a lead battery supplementary charge control to be executed by the starter generator 16 after an initial start of the engine 12. FIG. 8 illustrates an example of a situation as to how currents are supplied, in the engine initial start control. FIG. 9 illustrates an example of a situation as to how currents are supplied, in the lead battery supplementary charge control.

In a case where the control system of the vehicle 11 is started up, to cause the initial start of the engine 12, i.e., in a case where the operation of the starter button 43 starts the engine 12, the starter motor 40 may bring the engine 12 to the starting rotation. In the engine initial start control, as illustrated in FIG. 8, the switch SW1 may be controlled to the OFF state. The switch SW2 may be controlled to the OFF state. The starter relay 44 may be controlled to an ON state. Thus, currents are supplied from the lead battery 51 to the starter motor 40, bringing the starter motor 40 to rotation, to start the engine 12.

Thus, the engine 12 is started by the starter motor 40, and thereupon, as illustrated in FIG. 9, the starter relay 44 may be switched to an OFF state. The switch SW1 may be switched to the ON state. The starter generator 16 may be controlled to the combustion power generation state. In other words, at the start of the engine 12, while the switch SW2 is kept at the OFF state, the switch SW1 may be switched to the ON state, and the starter generator 16 may be controlled to the combustion power generation state. This makes it possible to allow the starter generator 16 to positively charge the lead battery 51, leading to restoration of the state of charge SOC of the lead battery 51 that tends to lower during a stop of the vehicle 11 or at the initial start of the engine 12.

For example, during the stop of the vehicle 11, a dark current flows from the lead battery 51 to the group of the electric devices 64. At the initial start of the engine 12, a large current flows from the lead battery 51 to the starter motor 40. Accordingly, the state of charge SOC of the lead battery 51 decreases gradually during the stop of the vehicle 11 and at the initial start of the engine 12. Executing the lead battery supplementary charge control after the initial start of the engine 12 causes the restoration of the lowered state of charge SOC of the lead battery 51. It is to be noted that the lead battery supplementary charge control after the initial start of the engine 12 may be continued for predetermined time, or alternatively, the lead battery supplementary charge control after the initial start of the engine 12 may be continued until the state of charge SOC of the lead battery 51 is restored to a predetermined value.

[ISG Abnormality Determination Control]

In the following, described is an ISG abnormality determination control to be executed by the main controller 80. The ISG abnormality determination control may include determining whether or not the starter generator 16 has a power generation failure. The ISG abnormality determination control may be executed by the abnormality determination unit 95 of the main controller 80 on predetermined cycles. Examples of the power generation failure of the starter generator 16 may include an abnormal state that the starter generator 16 has the power generation failure because of malfunctioning of the starter generator 16 or the control system, or both, an abnormal state that the starter generator 16 is brought to the powering state against a power generation command, an abnormal state that the positive electrode line 53 comes off the positive electrode terminal 16a of the starter generator 16, and an abnormal state that the negative electrode line 58 comes off the negative electrode terminal 16b of the starter generator 16.

In one implantation of the technology, the power generation failure may serve as an "abnormal state".

Figure 10:
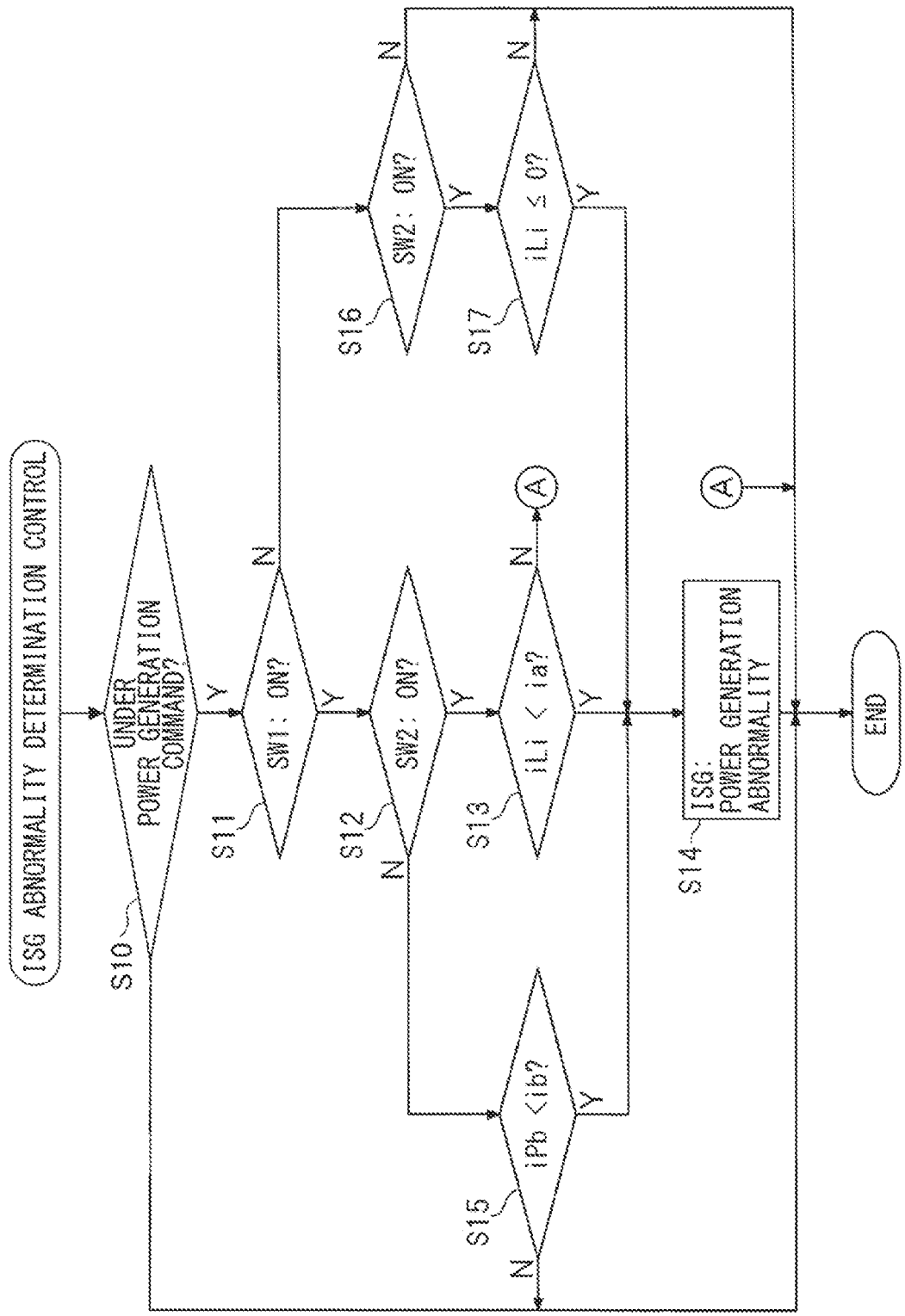
FIG. 10 is a flowchart of an example of an execution procedure of an ISG abnormality determination control.

FIG. 10 is a flowchart of an example of an execution procedure of the ISG abnormality determination control. In the flowchart of FIG. 10, a current value iLi denotes a value indicating a current, e.g., the discharge current and the charge current, of the lithium ion battery 52. A current value iPb denotes a value indicating a current, e.g., the discharge current and the charge current, of the lead battery 51. As to the current value iLi, a value of a current on charge side, i.e., a current to flow in the lithium ion battery 52, is dealt as a positive (+) value, while a value of a current on discharge side, or a current to flow from the lithium ion battery 52, is dealt as a negative (−) value. Likewise, as to the current value iPb, a value of a current on charge side, or a current to flow in the lead battery 51, is dealt as a positive (+) value, while a value of a current on discharge side, or a current to flow from the lead battery 51, is dealt as a negative (−) value. It is to be noted that reference characters A in FIG. 10 indicate a link in the flowchart.

As illustrated in FIG. 10, in step S10, a determination may be made as to whether or not the starter generator 16 is under the power generation command. In other words, a determination may be made as to whether or not the main controller 80 has outputted the power generation command to the starter generator 16. In step S10, a determination may be made that the starter generator 16 is under the power generation command, in a case where predetermined determination start time, e.g., one or two seconds, has elapsed since an output of the power generation command toward the starter generator 16. It is to be noted that examples of the situation that the power generation command is outputted to the starter generator 16 may include a situation that the starter generator 16 is controlled to the combustion power generation state, and a situation that the starter generator 16 is controlled to the regenerative power generation state.

As mentioned above, in step S10, in a case where the determination is made that the starter generator 16 is under the power generation command (Y in step S10), the flow may proceed to step S11. In step S11, a determination may be made as to whether or not the switch SW1 is in the ON state. In step S11, in a case where a determination is made that the switch SW1 is in the ON state (Y in step S11), the flow may proceed to step S12. In step S12, a determination may be made as to whether or not the switch SW2 is in the ON state.

(Determination Pattern 1)

In step S12, in a case where a determination is made that the switch SW2 is in the ON state (Y in step S12), the flow may proceed to step S13 because a determination pattern 1 is established. In other words, in a case where the switch SW1 is controlled to the ON state, the switch SW2 is controlled to the ON state, and the power generation command is outputted to the starter generator 16, the flow may proceed to step S13. In step S13, a determination may be made as to whether or not the current value iLi of the lithium ion battery 52 is lower than a current threshold ia on the discharge side for predetermined time, e.g., 0.1 second. The current threshold ia may be, for example, −5 A.

In step S13, in a case where a determination is made that the current value iLi is lower than the current threshold ia on the discharge side (Y in step S13), the flow may proceed to step S14. In other words, in a case where a determination is made that the discharge current is outputted from the lithium ion battery 52, the flow may proceed to step S14. In step S14, a determination is made that the starter generator 16 has a power generation abnormality. It is to be noted that in step S13, in a case where a determination is made that the current value iLi is equal to or greater than the current threshold ia on the discharge side (N in step S13), the routine is terminated because the starter generator 16 is normal. In the forgoing example embodiment, the current threshold ia is set at −5 A, or −5 amperes, in order to appropriately determine the discharge of the lithium ion battery 52. However, this is non-limiting. The current threshold ia may be set at zero (0) A.

Figure 11A:
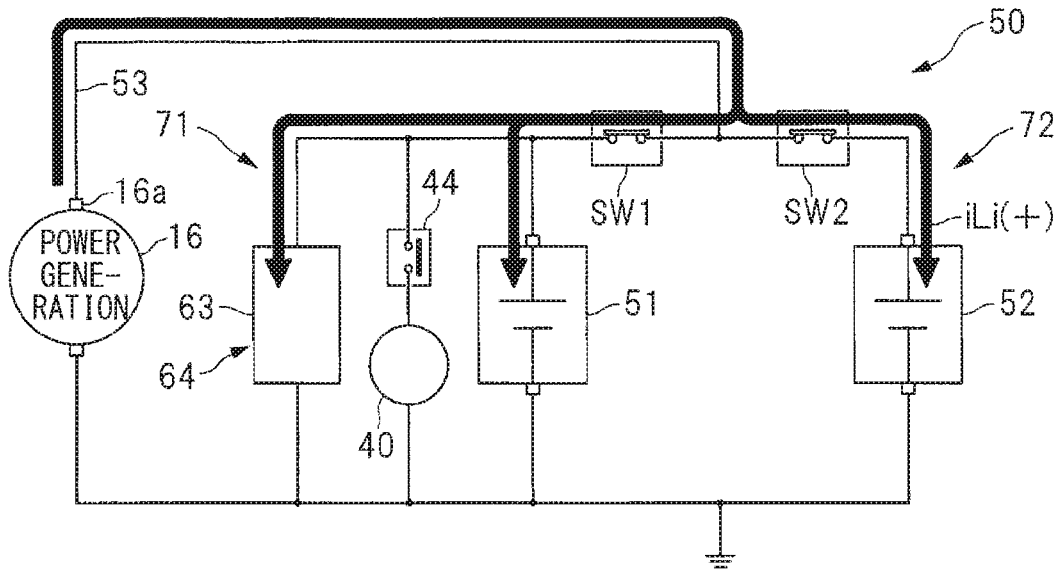
FIGS. 11A and 11B are diagrams of examples of situations as to how currents are supplied, in a determination pattern 1.
Figure 11B:
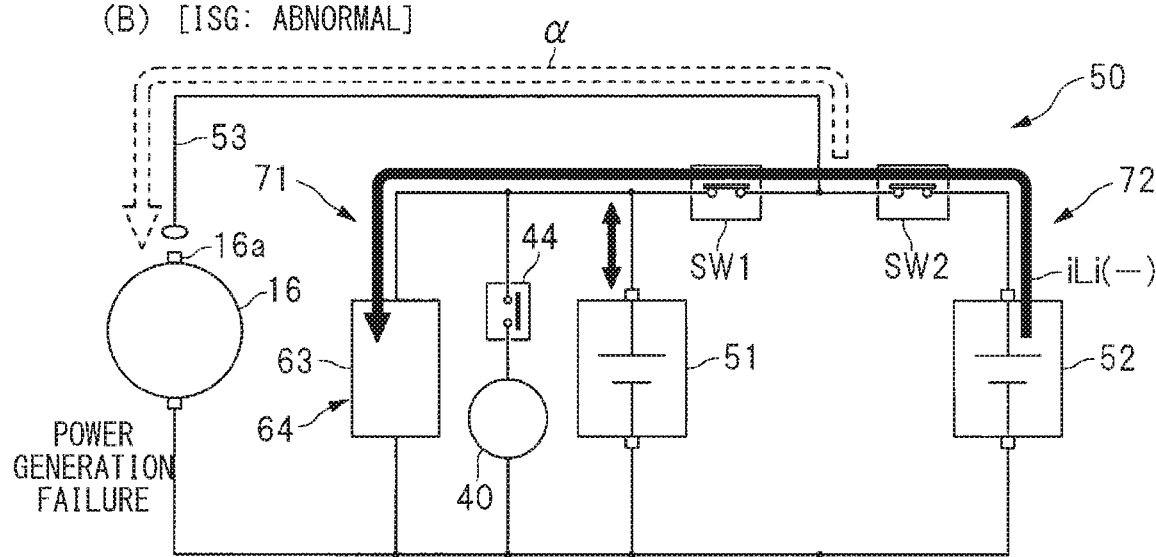

Described next are situations as to how currents are supplied in the determination pattern 1. FIGS. 11A and 11B illustrate examples of the situations as to how the currents are supplied in the determination pattern 1. FIG. 11A illustrates the situation as to how the currents are supplied, in a case with the starter generator 16 being normal. FIG. 11B illustrates the situation as to how the currents are supplied, in a case with the starter generator 16 having the power generation failure. It is to be noted that FIG. 11B illustrates the power generation abnormality of the starter generator 16, by giving an example of the abnormal state that the positive electrode line 53 comes off the positive electrode terminal 16a of the starter generator 16.

As illustrated in FIG. 11A, in a case where the starter generator 16 is carrying out the power generation normally, the currents are supplied from the starter generator 16 to the lithium ion battery 52. In other words, in the determination pattern 1, in the case with the starter generator 16 being normal, the lithium ion battery 52 is charged, causing the battery sensor 76 to detect the current value iLi on the charge side, or on positive (+) side.

Meanwhile, as illustrated in FIG. 11B, in a case where the starter generator 16 has the power generation abnormality, the currents are supplied from the lithium ion battery 52 to the group of the electric devices 64. In other words, in the determination pattern 1, in the case where the starter generator 16 having the power generation abnormality, the lithium ion battery 52 discharges, causing the battery sensor 76 to detect the current value iLi on the discharge side, or on the negative (−) side.

That is, in the determination pattern 1, the determination may be made that the starter generator 16 has the power generation abnormality, in the case where the current value iLi of the lithium ion battery 52 is detected on the discharge side, i.e., on the negative (−) side. In this way, it is possible to determine the power generation abnormality of the starter generator 16 on the basis of the current value iLi at timing when the starter generator 16 is controlled to the power generation state. Hence, it is possible to detect the power generation abnormality of the starter generator 16 at an early stage. This makes it possible to notify an occupant of the power generation abnormality with the use of, for example, a warning light before the vehicle 11 stops because of the power generation abnormality of the starter generator 16. It is therefore possible to prompt the occupant to have the starter generator 16 repaired as soon as possible.

Examples of the situation described in the determination pattern 1, i.e., the situation that the switch SW1 is controlled to the ON state, the switch SW2 is controlled to the ON state, and the starter generator 16 is controlled to the power generation state may include the situation that the starter generator 16 is controlled to the combustion power generation state and the regenerative power generation state, as illustrated in FIGS. 3 and 4. In other words, it is possible to determine the power generation abnormality of the starter generator 16 while controlling the starter generator 16 to the combustion power generation state and the regenerative power generation state. Hence, it is possible to detect the power generation abnormality of the starter generator 16 at the early stage.

As mentioned above, in step S10, the determination is made that the starter generator 16 is under the power generation command in the case where the predetermined determination start time has elapsed since the output of the power generation command to the starter generator 16. That is, in the flowchart in FIG. 10, the determination may be made as to whether or not the starter generator 16 is in the abnormal state after the determination start time has elapsed since the output of the power generation command to the starter generator 16. Moreover, in the determination pattern 1, the determination regarding the power generation abnormality is made with the use of the current value iLi of the lithium ion battery 52. There is, however, a time delay from a start of the power generation by the starter generator 16 to a start of the charge of the lithium ion battery 52. The time delay is caused by a chemical change in the lithium ion battery 52. Accordingly, determining the power generation abnormality of the starter generator 16 after the elapse of the determination start time makes it possible to precisely determine the power generation abnormality of the starter generator 16 with the use of the current value iLi. Hence, it is possible to appropriately execute the ISG abnormality determination control.

It is to be noted that the example in FIG. 11B illustrates the abnormal state that the starter generator 16 has the power generation failure, but this is non-limiting. Examples of the power generation abnormality of the starter generator 16 may include the abnormal state that the starter generator 16 is brought to the powering state against the power generation command. In the case where the starter generator 16 is controlled to the powering state against the power generation command as mentioned above, the currents are supplied from the lithium ion battery 52 to the starter generator 16, as denoted by a broken arrow α in FIG. 11B. In this case as well, the discharge current is outputted from the lithium ion battery 52. Accordingly, in the determination pattern 1, in the case where the current value iLi is detected on the discharge side, i.e., on the negative (−) side, it is possible to determine that the starter generator 16 has the power generation abnormality.

(Determination Pattern 2)

In step S12, in a case where a determination is made that the switch SW2 is in the OFF state (N in step S12), the flow may proceed to step S15 because a determination pattern 2 is established. In other words, in a case where the switch SW1 is controlled to the ON state, the switch SW2 is controlled to the OFF state, and the power generation command is outputted to the starter generator 16, the flow may proceed to step S15. In step S15, a determination may be made as to whether or not the current value iPb of the lead battery 51 is lower than a current threshold ib on the discharge side for predetermined time, e.g., 0.1 second. The current threshold ib may be, for example, −1 A.

In step S15, in a case where a determination is made that the current value iPb is lower than the current threshold ib on the discharge side (Y in step S15), the flow may proceed to step S14. In other words, in a case where a determination is made that the discharge current is outputted from the lead battery 51, the flow may proceed to step S14. In step S14, the determination may be made that the starter generator 16 has the power generation abnormality. It is to be noted that in step S15, in a case where a determination is made that the current value iPb is equal to or greater than the current threshold ib on the discharge side (N in step S15), the routine is terminated because the starter generator 16 is normal. In the forgoing example embodiment, the current threshold ib is set at −1 A, in order to appropriately determine the discharge of the lead battery 51. However, this is non-limiting. The current threshold ib may be set at zero (0) A.

Figure 12A:
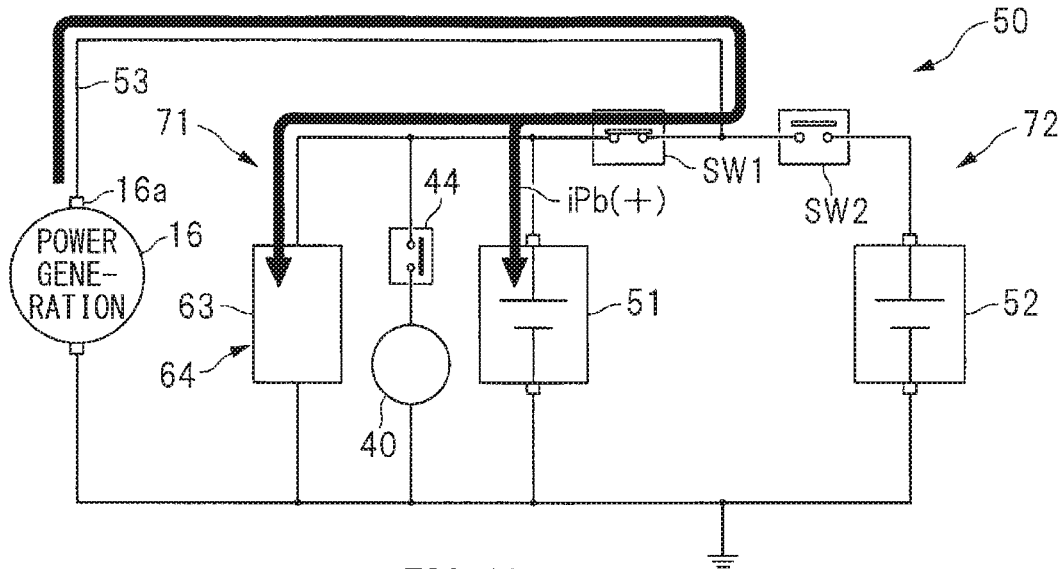
FIGS. 12A and 12B are diagrams of examples of situations as to how currents are supplied, in a determination pattern 2.
Figure 12B:
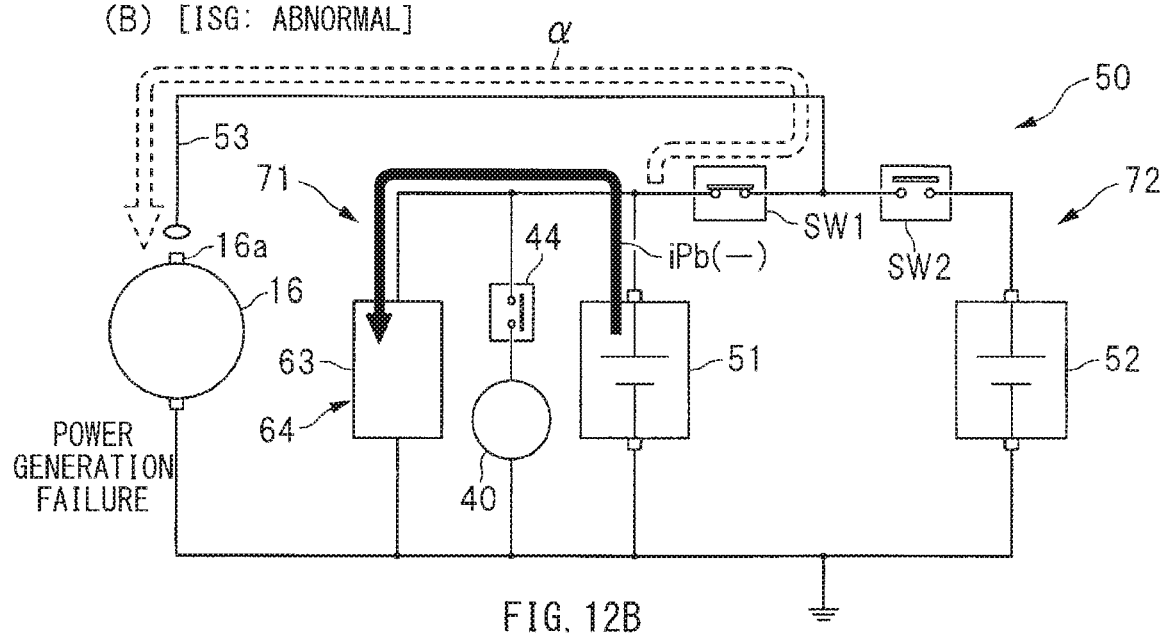

Described next are situations as to how currents are supplied in the determination pattern 2. FIGS. 12A and 12B illustrate examples of the situations as to how the currents are supplied in the determination pattern 2. FIG. 12A illustrates the situation as to how the currents are supplied, in the case with the starter generator 16 being normal. FIG. 12B illustrates the situation as to how the currents are supplied, in the case with the starter generator 16 having the power generation abnormality. It is to be noted that FIG. 12B illustrates the power generation abnormality of the starter generator 16, by giving the example of the abnormal state that the positive electrode line 53 comes off the positive electrode terminal 16a of the starter generator 16.

As illustrated in FIG. 12A, in the case where the starter generator 16 is carrying out the power generation normally, the currents are supplied from the starter generator 16 to the lead battery 51. In other words, in the determination pattern 2, in the case with the starter generator 16 being normal, the lead battery 51 is charged, causing the battery sensor 65 to detect the current value iPb on the charge side, or on the positive (+) side.

Meanwhile, as illustrated in FIG. 12B, in the case where the starter generator 16 has the power generation abnormality, the currents are supplied from the lead battery 51 to the group of the electric devices 64. In other words, in the determination pattern 2, in the case where the starter generator 16 has the power generation abnormality, the lead battery 51 discharges, causing the battery sensor 65 to detect the current value iPb on the discharge side, or on negative (−) side.

That is, in the determination pattern 2, the determination may be made that the starter generator 16 has the power generation abnormality, in the case where the current value iPb of the lead battery 51 is detected on the discharge side, i.e., on the negative (−) side. In this way, it is possible to determine the power generation abnormality of the starter generator 16 on the basis of the current value iPb at the timing when the starter generator 16 is controlled to the power generation state. Hence, it is possible to detect the power generation abnormality of the starter generator 16 at the early stage. This makes it possible to notify the occupant of the power generation abnormality with the use of, for example, the warning light before the vehicle 11 stops because of the power generation abnormality of the starter generator 16. It is therefore possible to prompt the occupant to have the starter generator 16 repaired as soon as possible.

Examples of the situation described in the determination pattern 2, i.e., the situation that the switch SW1 is controlled to the ON state, the switch SW2 is controlled to the OFF state, and the starter generator 16 is controlled to the combustion power generation state may include the situation that the lead battery supplementary charge control is executed, as illustrated in FIG. 9. In other words, it is possible to detect the power generation abnormality of the starter generator 16 at the early stage, by determining the power generation abnormality of the starter generator 16 in executing the lead battery supplementary charge control. It is to be noted that the lead battery supplementary charge control is executed after the initial start of the engine 12, but this is non-limiting. The lead battery supplementary charge control may be executed in a case where the SOC or the terminal voltage of the lead battery 51 lowers.

As mentioned above, in the flowchart of FIG. 10, the determination is made as to whether or not the starter generator 16 is in the abnormal state after the predetermined determination start time has elapsed from the output of the power generation command to the starter generator 16. Moreover, in the determination pattern 2, the determination regarding the power generation abnormality is made with the use of the current value iPb of the lead battery 51. There is, however, a time delay from the start of the power generation by the starter generator 16 to a start of the charge of the lead battery 51. The time delay is caused by a chemical change in the lead battery 51. Accordingly, determining the power generation abnormality of the starter generator 16 after the elapse of the determination start time makes it possible to precisely determine the power generation abnormality of the starter generator 16 with the use of the current value iPb. Hence, it is possible to appropriately execute the ISG abnormality determination control.

It is to be noted that the example in FIG. 12B illustrates the abnormal state that the starter generator 16 has the power generation failure, but this is non-limiting. Examples of the power generation abnormality of the starter generator 16 may include the abnormal state that the starter generator 16 is brought to the powering state against the power generation command. In the case where the starter generator 16 is controlled to the powering state against the power generation command as mentioned above, the currents are supplied from the lead battery 51 to the starter generator 16, as denoted by a broken arrow α in FIG. 12B. In this case as well, the discharge current is outputted from the lead battery 51. Accordingly, in the determination pattern 2, in the case where the current value iPb is detected on the discharge side, i.e., on the negative (−) side, it is possible to determine that the starter generator 16 has the power generation abnormality.

(Determination Pattern 3)

In step S11, in a case where a determination is made that the switch SW1 is in the OFF state (N in step S11), the flow may proceed to step S16. In step S16, a determination may be made as to whether or not the switch SW2 is in the ON state. In step S16, in a case where the switch SW2 is in the ON state (Y in step S16), the flow may proceed to step S17 because a determination pattern 3 described later is established. In other words, in a case where the switch SW1 is controlled to the OFF state, the switch SW2 is controlled to the ON state, and the power generation command is outputted to the starter generator 16, the flow may proceed to step S17. In step S17, a determination may be made as to whether or not the current value iLi of the lithium ion battery 52 is equal to or smaller than zero (0) A for predetermined time, e.g., 0.1 second.

In step S17, in a case where a determination is made that the current value iLi is equal to or smaller than zero (0) A (Y in step S17), the flow may proceed to step S14. In other words, in a case where a determination is made that no charge current is inputted to the lithium ion battery 52, i.e., in a case where the lithium ion battery 52 is devoid of charge current supply, and in a case where a determination is made that the discharge current is outputted from the lithium ion battery 52, the flow may proceed to step S14. In step S14, the determination is made that the starter generator 16 has the power generation abnormality. It is to be noted that in step S17, in a case where a determination is made that the current value iLi is greater than zero (0) A (N in step S17), the routine is terminated because the starter generator 16 is normal.

Figure 13A:
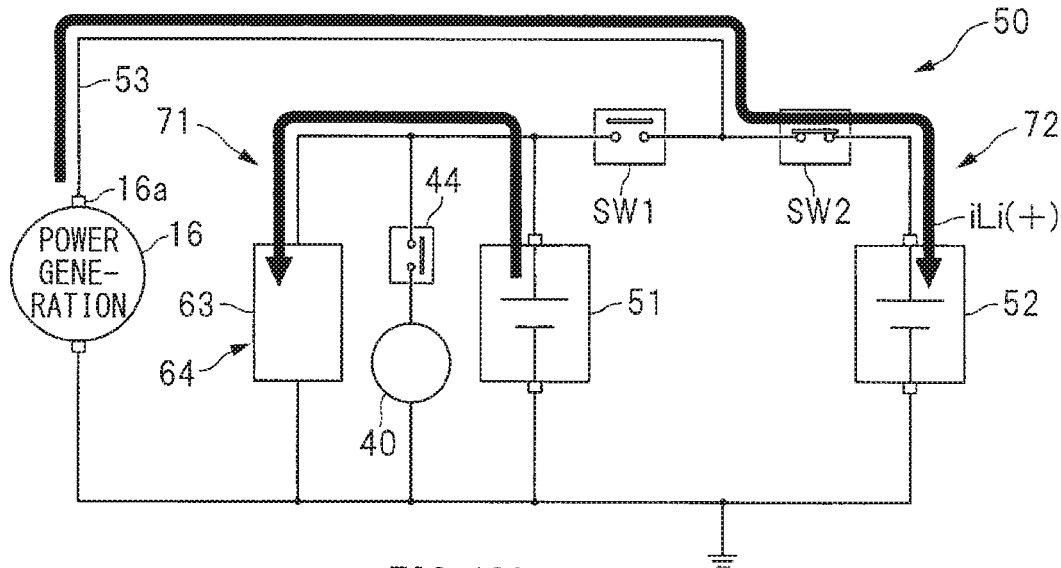
FIGS. 13A and 13B are diagrams of examples of situations as to how currents are supplied, in a determination pattern 3.
Figure 13B:
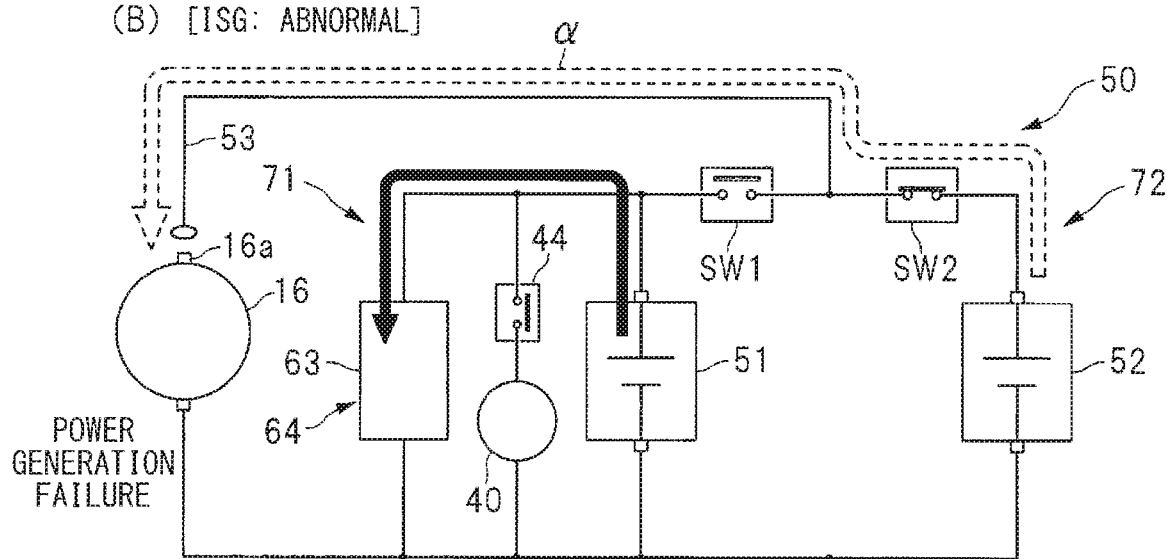

Described next are situations as to how currents are supplied in the determination pattern 3. FIGS. 13A and 13B illustrate examples of the situations as to how the currents are supplied in the determination pattern 3. FIG. 13A illustrates the situation as to how the currents are supplied, in the case with the starter generator 16 being normal. FIG. 13B illustrates the situation as to how the currents are supplied, in the case with the starter generator 16 having the power generation abnormality. It is to be noted that FIG. 13B illustrates the power generation abnormality of the starter generator 16, by giving the example of the abnormal state that the positive electrode line 53 comes off the positive electrode terminal 16a of the starter generator 16.

As illustrated in FIG. 13A, in the case where the starter generator 16 is carrying out the power generation normally, the currents are supplied from the starter generator 16 to the lithium ion battery 52. In other words, in the determination pattern 3, in the case with the starter generator 16 being normal, the lithium ion battery 52 is charged, causing the battery sensor 76 to detect the current value iLi on the charge side, or on the positive (+) side.

Meanwhile, as illustrated in FIG. 13B, in the case where the starter generator 16 has the power generation abnormality, causing the power generation failure in the starter generator 16, the current supply from the starter generator 16 to the lithium ion battery 52 is stopped. In other words, in the determination pattern 3, in the case where the starter generator 16 having the power generation failure, the charge of the lithium ion battery 52 is stopped, causing the battery sensor 76 to detect the current value iLi of zero (0) A.

It is to be noted that in the example illustrated in FIG. 13B, the second power supply system 72 does not include any electric devices such as actuators. It follows, therefore, that the current value iLi of zero (0) A is detected in the case where the starter generator 16 has the power generation failure in the determination pattern 3. However, this is non-limiting. For example, in a case where the second power supply system 72 includes electric devices, when the starter generator 16 has the power generation failure in the determination pattern 3, the currents are supplied from the lithium ion battery 52 to the electric devices. A determination may be, therefore, made that the starter generator 16 has the power generation failure, in a case where the current value iLi on the discharge side, or the negative (−) side is detected by the battery sensor 76.

Moreover, the example in FIG. 13B illustrates the abnormal state that the starter generator 16 has the power generation failure, but this is non-limiting. Examples of the power generation abnormality of the starter generator 16 may include the abnormal state that the starter generator 16 is brought to the powering state against the power generation command. In the case where the starter generator 16 is controlled to the powering state against the power generation command as mentioned above, the currents are supplied from the lithium ion battery 52 to the starter generator 16, as denoted by a broken arrow α in FIG. 13B. In this case, the lithium ion battery 52 discharges, causing the battery sensor 76 to detect the current value iLi on the discharge side, i.e., on the negative (−) side.

As described, in the determination pattern 3, in the case where the current value iLi of the lithium ion battery 52 is zero (0) A, the determination may be made that the starter generator 16 has the power generation failure. Whereas in the case with the current value iLi of the lithium ion battery 52 on the discharge side, i.e., on the negative (−) side, the determination may be made that the starter generator 16 is in the powering state against the power generation command. In other word, in the determination pattern 3, the determination may be made that the starter generator 16 has the power generation abnormality, in the case where the current value iLi of the lithium ion battery 52 is equal to or smaller than zero (0) A.

In this way, it is possible to determine the power generation abnormality of the starter generator 16 on the basis of the current value iLi at the timing when the starter generator 16 is controlled to the power generation state. Hence, it is possible to detect the power generation abnormality of the starter generator 16 at the early stage. This makes it possible to notify the occupant of the power generation abnormality with the use of, for example, the warning light before the vehicle 11 stops because of the power generation abnormality of the starter generator 16. It is therefore possible to prompt the occupant to have the starter generator 16 repaired as soon as possible.

As mentioned above, in the flowchart of FIG. 10, the determination is made as to whether or not the starter generator 16 is in the abnormal state after the predetermined determination start time has elapsed since the output of the power generation command to the starter generator 16. Moreover, in the determination pattern 3, the determination regarding the power generation abnormality is made with the use of the current value iLi of the lithium ion battery 52. However, the time delay occurs from the start of the power generation by the starter generator 16 to the start of the charge of the lithium ion battery 52. The time delay is caused by the chemical change in the lithium ion battery 52. Accordingly, determining the power generation abnormality of the starter generator 16 after the elapse of the determination start time makes it possible to precisely determine the power generation abnormality of the starter generator 16 with the use of the current value iLi. Hence, it is possible to appropriately execute the ISG abnormality determination control.

Although some preferred embodiments of the technology are described above by way of example with reference to the accompanying drawings, the technology is by no means limited to the embodiments described above. It should be appreciated that modifications and alterations may be made by persons skilled in the art without departing from the scope as defined by the appended claims. In the forgoing example embodiments, the starter generator 16 is adopted as the generator coupled to the engine 12. The starter generator 16 may serve as the electric motor and the generator. However, this is non-limiting. For example, an alternator that serves solely as the generator may be adopted. Moreover, in the forgoing example embodiments, the lead battery 51 may serve as the "first electrical energy accumulator", but this is non-limiting. Other kinds of batteries or capacitors may be adopted as the "first electrical energy accumulator". Furthermore, in the forgoing example embodiments, the lithium ion battery 52 may serve as the "second electrical energy accumulator", but this is non-limiting. Other kinds of batteries or capacitors may be adopted as the "second electrical energy accumulator". In addition, in the forgoing example embodiments illustrated in FIGS. 1 and 2, the switch SW2 is provided on the positive electrode line 54 of the lithium ion battery 52, but this is non-limiting. For example, as denoted by an alternate long and short dashed line in FIG. 2, the switch SW2 may be provided on the negative electrode line 59 of the lithium ion battery 52.

In the flowchart illustrated in FIG. 10, the determination is made as to whether or not the starter generator 16 has the power generation abnormality on the basis of the determination patterns 1 to 3, but this is non-limiting. The determination as to whether or not the starter generator 16 has the power generation abnormality may be made solely on the basis of the determination pattern 1. Alternatively, the determination as to whether or not the starter generator 16 has the power generation abnormality may be made solely on the basis of the determination pattern 2. In another alternative, the determination as to whether or not the starter generator 16 has the power generation abnormality may be made solely on the basis of the determination pattern 3.

Moreover, in the determination pattern 3, the determination is made that the starter generator 16 has the power generation abnormality in the case where the current value iLi of the lithium ion battery 52 is equal to or smaller than zero (0) A, but this is non-limiting. For example, in the determination pattern 3, the determination may be made that the starter generator 16 has the power generation abnormality solely in a case where the current value iLi of the lithium ion battery 52 is zero (0) A, i.e., in a case where no charge current is inputted to the lithium ion battery 52.

Furthermore, in the determination pattern 3, the determination may be made that the starter generator 16 has the power generation abnormality solely in a case where the current value iLi of the lithium ion battery 52 is on the discharge side, or the negative (−) side, i.e., in a case where the discharge current is outputted from the lithium ion battery 52.

In addition, in the forgoing example embodiments, the main controller 80 includes the engine control unit 90, the ISG control unit 91, the switch control unit 92, the idling control unit 93, the assistance control unit 94, and the abnormality determination unit 95, but this is non-limiting. The engine control unit 90, the ISG control unit 91, the switch control unit 92, the idling control unit 93, the assistance control unit 94, or the abnormality determination unit 95, or any combination thereof may be provided in other controllers.

The main controller 80, the engine control unit 90, the ISG control unit 91, the switch control unit 92, the idling control unit 93, the assistance control unit 94, and the abnormality determination unit 95 illustrated in FIG. 1 are implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the main controller 80, engine control unit 90, the ISG control unit 91, the switch control unit 92, the idling control unit 93, the assistance control unit 94, and the abnormality determination unit 95. Such a medium may take many forms, including, but not limited to, any type of magnetic medium such as a hard disk, any type of optical medium such as a CD and a DVD, any type of semiconductor memory (i.e., semiconductor circuit)

such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the main controller 80, the engine control unit 90, the ISG control unit 91, the switch control unit 92, the idling control unit 93, the assistance control unit 94, and the abnormality determination unit 95 illustrated in FIG. 1.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. A vehicle power supply apparatus to be mounted on a vehicle that includes an engine, the vehicle power supply apparatus comprising:
a first power supply system including a first electrical energy accumulator and an electric load coupled to the first electrical energy accumulator;
a second power supply system including a generator and a second electrical energy accumulator, the generator being coupled to the engine, and the second electrical energy accumulator being able to be coupled to the generator;
an electrical conduction path provided between the first power supply system and the second power supply system and configured to couple the first electrical energy accumulator and the second electrical energy accumulator in parallel to each other;
a first switch provided on the electrical conduction path and configured to be turned on to couple the first power supply system and the second power supply system to each other, and turned off to fully isolate the first power supply system and the second power supply system from each other;
a second switch provided in the second power supply system and configured to be turned on to couple the generator and the second electrical energy accumulator to each other, and turned off to isolate the generator and the second electrical energy accumulator from each other; and
an abnormality determination unit configured to determine that the generator is in an abnormal state based on a current of the first electrical energy accumulator or the second electrical energy accumulator with respect to 1) the first switch the second switch, or both being turned on and 2) a power generation command being outputted to the generator.

2. The vehicle power supply apparatus according to claim 1, wherein the abnormality determination unit determines that the generator is in the abnormal state, on a condition that a discharge current is outputted from the second electrical energy accumulator, with the first switch turned on, with the second switch turned on, and with the power generation command outputted to the generator.

3. The vehicle power supply apparatus according to claim 1, wherein the abnormality determination unit determines that the generator is in the abnormal state, on a condition that a discharge current is outputted from the first electrical energy accumulator, with the first switch turned on, with the second switch turned off, and with the power generation command outputted to the generator.

4. The vehicle power supply apparatus according to claim 1, wherein the abnormality determination unit determines that the generator is in the abnormal state, on a condition that the second electrical energy accumulator is devoid of charge current supply, with the first switch turned off, with the second switch turned on, and with the power generation command outputted to the generator.

5. The vehicle power supply apparatus according to claim 1, wherein the abnormality determination unit determines that the generator is in the abnormal state, on a condition that a discharge current is outputted from the second electrical energy accumulator, with the first switch turned off, the second switch turned on, and with the power generation command outputted to the generator.

6. The vehicle power supply apparatus according to claim 1, wherein the abnormality determination unit determines whether or not the generator is in the abnormal state after determination start time has elapsed since an output of the power generation command to the generator.

7. The vehicle power supply apparatus according to claim 2, wherein the abnormality determination unit determines whether or not the generator is in the abnormal state after determination start time has elapsed since an output of the power generation command to the generator.

8. The vehicle power supply apparatus according to claim 3, wherein the abnormality determination unit determines whether or not the generator is in the abnormal state after determination start time has elapsed since an output of the power generation command to the generator.

9. The vehicle power supply apparatus according to claim 4, wherein the abnormality determination unit determines whether or not the generator is in the abnormal state after determination start time has elapsed since an output of the power generation command to the generator.

10. The vehicle power supply apparatus according to claim 5, wherein the abnormality determination unit determines whether or not the generator is in the abnormal state after determination start time has elapsed since an output of the power generation command to the generator.

11. The vehicle power supply apparatus according to claim 1, wherein internal resistance of the second electrical energy accumulator is lower than internal resistance of the first electrical energy accumulator.

12. The vehicle power supply apparatus according to claim 2, wherein internal resistance of the second electrical energy accumulator is lower than internal resistance of the first electrical energy accumulator.

13. The vehicle power supply apparatus according to claim 3, wherein internal resistance of the second electrical energy accumulator is lower than internal resistance of the first electrical energy accumulator.

14. The vehicle power supply apparatus according to claim 4, wherein internal resistance of the second electrical energy accumulator is lower than internal resistance of the first electrical energy accumulator.

15. The vehicle power supply apparatus according to claim 5, wherein internal resistance of the second electrical energy accumulator is lower than internal resistance of the first electrical energy accumulator.

16. The vehicle power supply apparatus according to claim 6, wherein internal resistance of the second electrical energy accumulator is lower than internal resistance of the first electrical energy accumulator.

17. A vehicle power supply apparatus to be mounted on a vehicle that includes an engine, the vehicle power supply apparatus comprising:
- a first power supply system including a first electrical energy accumulator and an electric load coupled to the first electrical energy accumulator;
- a second power supply system including a generator and a second electrical energy accumulator, the generator being coupled to the engine, and the second electrical energy accumulator being able to be coupled to the generator;
- an electrical conduction path provided between the first power supply system and the second power supply system and configured to couple the first electrical energy accumulator and the second electrical energy accumulator in parallel to each other;
- a first switch provided on the electrical conduction path and configured to be turned on to couple the first power supply system and the second power supply system to each other, and turned off to fully isolate the first power supply system and the second power supply system from each other;
- a second switch provided in the second power supply system and configured to be turned on to couple the generator and the second electrical energy accumulator to each other, and turned off to isolate the generator and the second electrical energy accumulator from each other; and
- circuitry configured to determine that the generator is in an abnormal state based on a current of the first electrical energy accumulator or the second electrical energy accumulator with respect to 1) the first switch, the second switch, or both being turned on and 2) a power generation command being outputted to the generator.

18. The vehicle power supply apparatus according to claim 1, wherein the abnormality determination unit determines that the generator is in the abnormal state, on a condition that a discharge current is outputted from the first electrical energy accumulator when the first electrical energy accumulator charge is executed, with the first switch turned on, with the second switch turned off, and with the power generation command outputted to the generator.

19. The vehicle power supply apparatus according to claim 18, wherein the abnormality determination unit determines that the generator is in the abnormal state when the first electrical energy accumulator charge is executed after an initial start of the engine.

* * * * *